Oct. 30, 1962  C. H. BRUMLEY ETAL  3,060,800
SLIDE PROJECTOR

Filed March 5, 1959  5 Sheets-Sheet 1

FIG. 1

INVENTORS
CORWIN H. BRUMLEY
JAMES A. CLARK
BY
ATTORNEYS

INVENTORS
CORWIN H. BRUMLEY
JAMES A. CLARK
BY
ATTORNEYS

Oct. 30, 1962    C. H. BRUMLEY ETAL    3,060,800
SLIDE PROJECTOR
Filed March 5, 1959    5 Sheets-Sheet 5

INVENTORS
CORWIN H. BRUMLEY
JAMES A. CLARK
BY
*J. A. Ellestad*
*B. A. Chiara*
ATTORNEYS

൧

3,060,800
SLIDE PROJECTOR
Corwin H. Brumley, Penfield, and James A. Clark, Brighton, N.Y., assignors to Bausch & Lomb Incorporated, a corporation of New York
Filed Mar. 5, 1959, Ser. No. 797,397
4 Claims. (Cl. 88—28)

The present invention relates to projection apparatus and, more particularly, to a slide projector having a removeable magazine or tray for holding the slides which are to be projected.

In instruments of this general character, there is usually employed a number of integrated mechanisms which cooperate to perform the desired result of semi-automatic or automatic projection. To this end, there is usually provided a slide pickup and return mechanism, an automatic timer control, a slide tray indexing or feeding device, and a circuit having various switches which are actuated in predetermined sequences to maintain automatic action. The present invention contemplates an additional feature to the above and takes the form of a novel tray holding and release mechanism for insuring the stopping of the tray in its holder when the tray is initially inserted therein such that the first slide in the tray will be located for projection. Means are also provided for releasing this stopping effect upon the tray when the first slide is moved to projection position thereby permitting normal indexing of the tray.

The principal object of this invention is to provide a slide projector of the type described in which the slide tray upon insertion in the projector is automatically located so that the first slide in the tray is in position to be moved into projection position.

Further objects and advantages will be apparent to those skilled in the art by reference to the following specification and accompanying drawing wherein:

Figure 1:
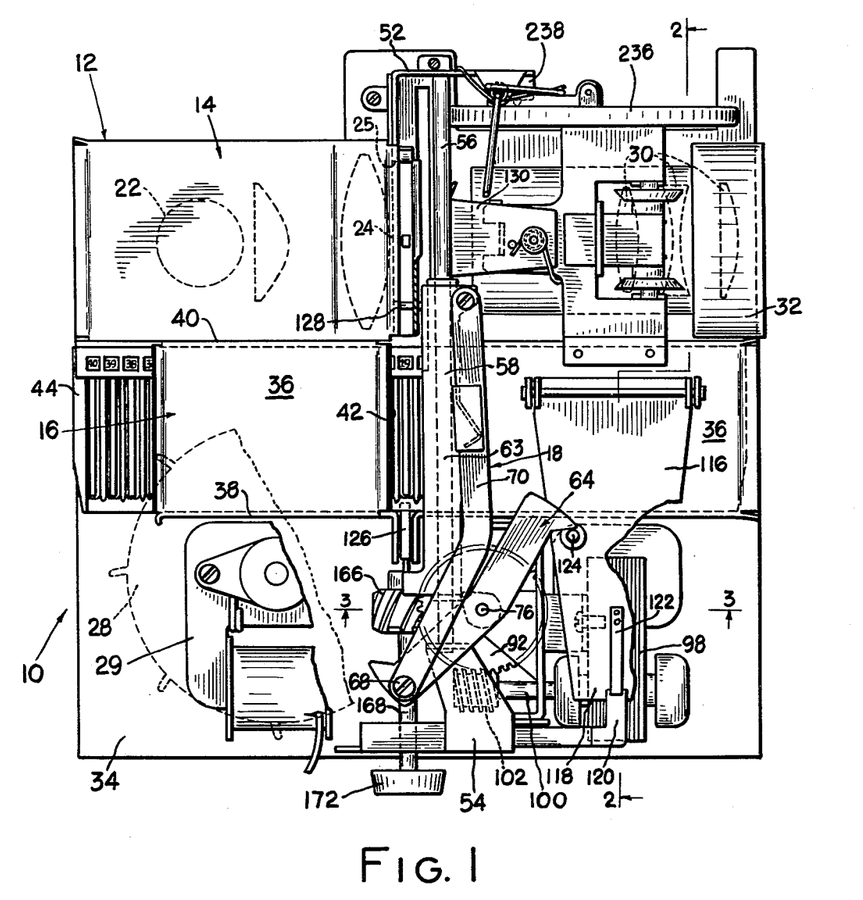
FIG. 1 is a plan view of a projector embodying the various features of the present invention with the casing or cover removed.
Figure 2:
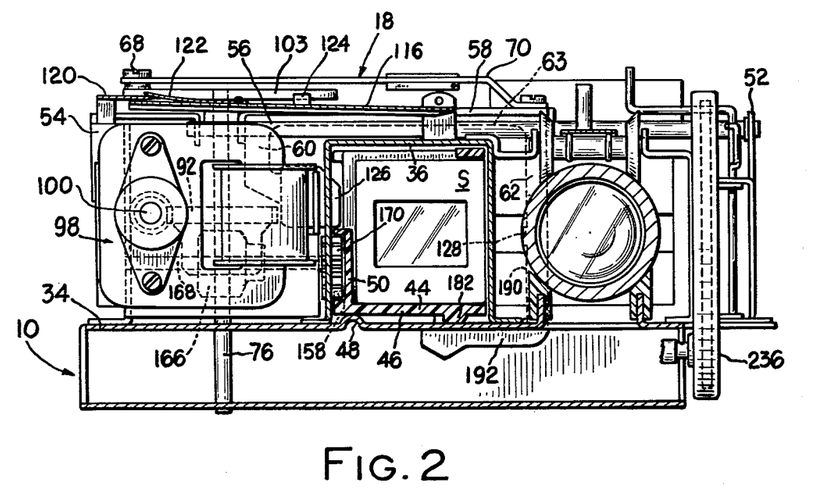
FIG. 2 is a sectional view taken along the line 2—2 in FIG. 1.

Referring to the drawings and more particularly to FIGS. 1 and 2, there is shown a slide projector having a base 10 for mounting a suitable decorative cover cabinet (not shown) and for mounting the various mechanisms of the present invention. Arranged on the base 10 is a light source 12, a projection system 14, a slide tray holder 16, and a slide pickup and return mechanism 18.

Figure 4:
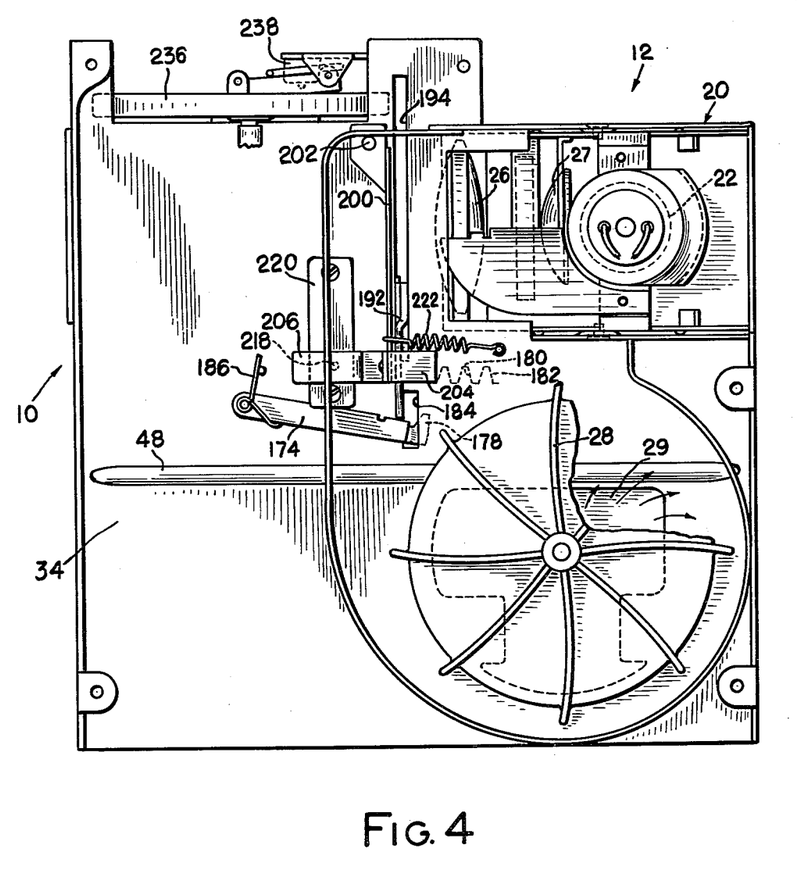
FIG. 4 is a bottom view of the projector shown in FIG. 1.

Referring now to FIG. 4, the light source 12 is shown as including a housing or shield 20 which is suitably mounted on the base 10 and serves to protect a conventional projector lamp 22. The housing has a front wall 24 which is formed with an aperture 25 through which light is projected from the lamp 22 by a system of condensing lenses 26, 27. A suitable fan 28 rotatably driven by a motor 29 serves to cool the lamp 22 and the condensing lenses.

In axial alignment with the lamp 22 and the condensing lenses 26, 27 is a focusing lens system 30 shown in FIG. 1 as housed in a suitable tube enclosure 32 which together with the condensing lenses comprise the optical system 14. A focusing mechanism (not shown) may be utilized to move the projection lens system 30 toward or away from the condensing lenses. Further description of the focusing mechanism is unnecessary since its operation will become immediately apparent to those skilled in the art.

As noted in FIG. 1, the axis of the projection system comprising the lamp 22, the lenses 26, 27 and the tube 32 is slightly offset with respect to the center line of the base 10 in order to accommodate a tray carrying a plurality of slides. Immediately adjacent to the projection system and having its axis parallel with the axis of the projection system is the slide tray holder 16 which is suitably mounted on the deck 34 of the base 10. As shown in FIG. 1, the tray holder is formed as an integral three-sided longitudinally extending box having a top 36 and two sides 38, 40. Actually, the holder 16 comprises two identical box-like structures in axial alignment and provided with an open area or slot between adjacent ends for permitting egress and ingress of slide transparencies. This is seen in FIG. 1, where a slot 42 is located intermediate the ends of the holder 16. For purposes of this invention and further description thereof, the holder is considered to be a unitary structure formed with a slot intermediate its ends.

The slide tray holder is designed to slidably support a slide tray 44 which may be inserted at one end of the holder (left as viewed in FIG. 1) and drawn out at the other end. The tray is constructed with a bottom support plate 46 which rests upon a longitudinally extending ridge 48 formed on the deck 34 and a side wall 50 (see FIG. 2). Advancing mechanism for moving the tray through the holder in a step-by-step fashion will be described hereinafter.

Figure 7:
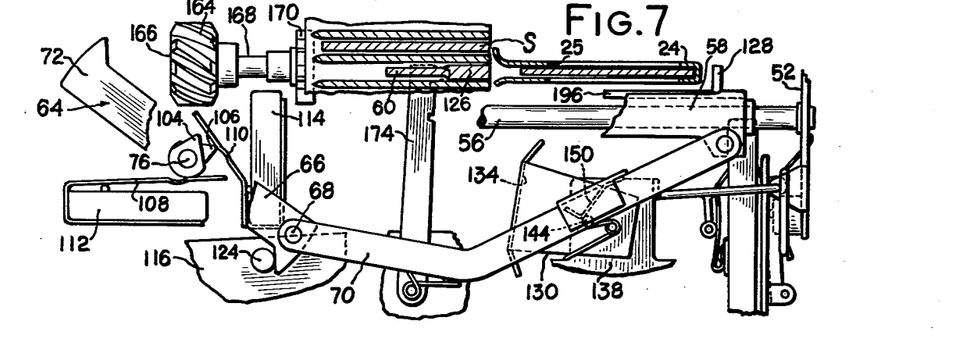
Figure 8:
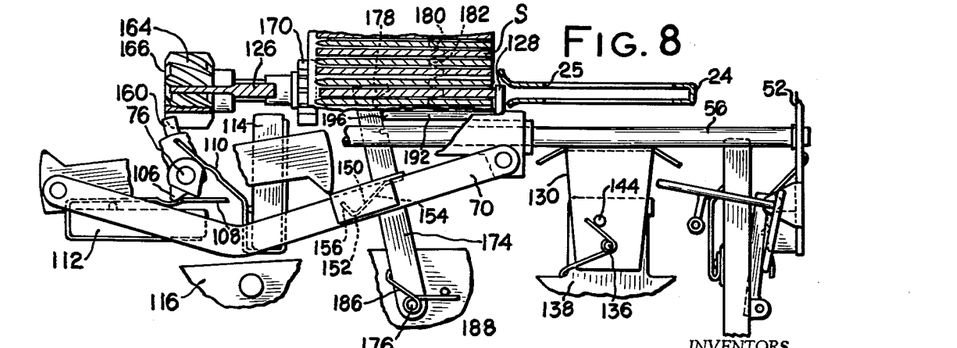

The slide pickup and return mechanism 18 comprising a slide transfer device will now be described in detail. Mounted adjacent to the opposing sides of the base 10 and in a transverse plane with respect to the axis of the tray holder 16 is a pair of uprights 52, 54 which serve to support the mechanism 18 above the base 10. Each of the uprights 52, 54 is provided with an opening, respectively, for receiving one end of a slide rod 56. A U-shaped slide transfer element 58 is slidably mounted on the rod 56 and is provided with downwardly depending leg portions 60, 62, integrally formed at the ends of the bight portion 63 of the element 58. Suitable openings formed in the leg portions 60, 62 are adapted to receive the rod 56 for permitting sliding movement thereon. It will be apparent that the transfer element 58 is movable between two positions on the rod 56, that is, between a projection position such as shown in FIG. 7, and a pickup or return position as shown in FIGS. 2 and 8.

Figure 3:
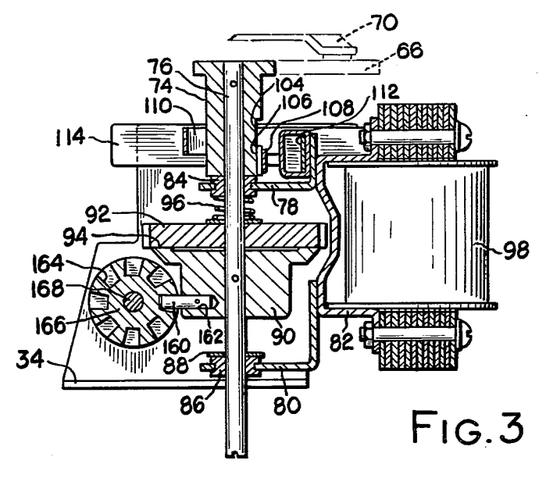
FIG. 3 is a partial sectional view taken along the line 3—3 in FIG. 1.

Reciprocable movement of the transfer element 58 on the rod 56 is effected by means of a drive mechanism which includes a rotatable crank 64 having an arm 66 pivotally connected at 68 to one end of a link 70 which has its other end pivotally connected to the bight portion 63 of the element 58 adjacent the leg 60. The crank 64 is also provided with a second arm 72 positioned at 180° from the arm 66 and is made integral on a sleeve 74. This sleeve is mounted on a shaft 76 which is held in a vertical position by a pair of vertically spaced bearing supports 78, 80 secured to an upwardly extending support 82 secured to the base 10. As shown in FIG. 3, each of the supports 78, 80 is provided with a bearing 84, 86, respectively, in which the shaft 76 is rotatably received. The lower end of the shaft has secured thereto a washer 88 which slidably rests upon the bearing 86 for preventing the shaft from falling downwardly in its support. Also secured to the shaft 76 is a clutch sleeve 90 located between the bearings 84, 86, and immediately above this sleeve is a gear 92 which slidably receives the shaft 76. A circular surface 94 on the sleeve 90 is adapted to engage the adjacent face of the gear 92 for imparting rotation to the former during positive driving of the latter. A light coil spring 96, held in compression between the upper bearing 84 and the gear 92, serves to maintain the frictional engagement between the sleeve clutch surface 94 and the gear 96.

Rotation of the shaft 76 and consequently the crank arm 66 is effected by an electric motor 98 having a drive shaft 100 and a worm gear 102 connected thereto and in operative engagement with the gear 92. Upon rotation of the shaft 100, the gear 92 will be correspondingly rotated and because of the spring induced frictional engagement between the gear 92 and the clutch sleeve 90, the rotation will be imparted to the shaft 76. During operation of the projector, there are occasions when the rotation of the shaft 76 is abruptly stopped and before the motor shaft 100 is able to come to a complete stop for reasons of the inertial effects on the armature of the motor 98. In these events, the rotation of the gear 92 would have stopped along with the rotation of the shaft 76, however, the rotation of the sleeve 90 may continue for a short duration while the motor 98 is coming to rest. In effect then, the slippage connection between the gear 92 and the sleeve 90 allows the motor to come to a gradual stop rather than an abrupt stop, thereby eliminating damage thereto.

As shown in FIGS. 3, 6, 7 and 8, a pair of vertically spaced cams 104, 106 are formed radially on the sleeve 74 and each of these cams is cooperable with a leaf spring lever 108, 110, respectively. The lever 108, when flexed by the cam 104, opens a normally closed load limit switch 112 while the lever 110, when flexed by the cam 106, opens a normally closed projection limit switch 114. The functioning of these cams and switches will be described hereinafter.

Abrupt braking of the rotation of the crank 64 when the transfer element 58 is moved to either the projection or pickup positions is accomplished by means of an armature in the form of a plate 116 pivotally mounted at one end to the top 36 of the tray holder 16. The other end 118 of the plate 116 extends over the motor 98 and is adapted for limited arcuate movement in a vertical plane between a stop member 120 secured to the frame of the motor and extending over the end 118 and the motor itself. A leaf spring 122 secured at one end to the top of the armature 116 and engageable with the stop 120 prevents sudden slamming of the armature against the motor while at the same time continuously biasing the end 118 in an upward direction against the stop 120. A pin 124 is secured to the upper surface of the armature 116 and is cooperable with the ends of each of the arms 66 and 72 for braking rotation of the crank 64. When the motor 98 is energized for rotating the gear 92, the magnetic flux surrounding the motor is sufficient to attract the armature 116 for rotating the same downwardly against the bias of the spring 122. This movement of the armature will be sufficient to clear the engagement of the pin 124 with respect to either of the arms 66, 72 and thereby permit rotation of the gear 92. When the motor 98 is deenergized, the armature will be forced upwardly by the spring 122 for interposing the pin 124 in the path of either of the arms 66, 72 whereupon the rotation of the crank 64 and consequently the gear 92 will be positively and abruptly stopped. The mechanical relationship between the transfer element 58, the link 70, the crank 64 and the pin 124 is such that this positive stoppage occurs when the transfer element is in either of its extreme positions on the rod 56.

It will be apparent from the foregoing description that rotation of the crank 64 will cause reciprocation of the transfer element 58 between a slide pickup or return position to a projection position opposite the aperture 25 in the wall 24. The depending leg 60 of the transfer element 58 has secured at one end thereof a slide engaging pad 126 for moving a slide into projection position from the tray 44. Similarly, the depending leg 62 has secured at its lower end a pad 128 for engaging a slide when the transfer element is moving to the loading position. During operation, the legs 60, 62 move in a plane parallel to the axis of the rod 56 for moving a slide between pickup and projection positions.

Figure 6:
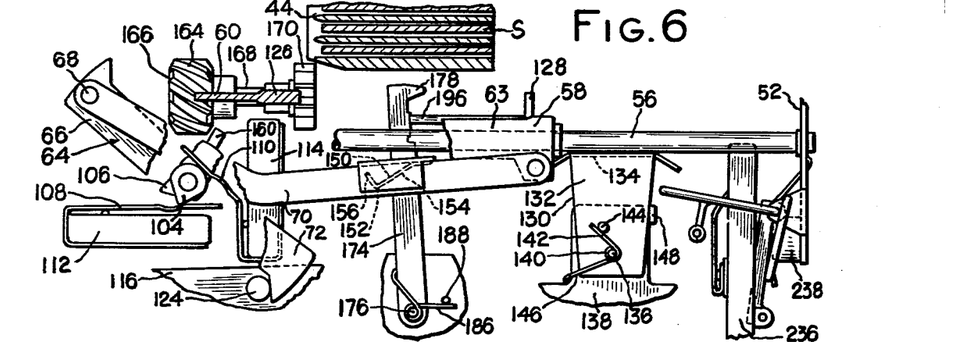
FIGS. 6, 7 and 8 are fragmentary views of the slide changing mechanism in various positions of operation.

In FIG. 6, the parts of the transfer mechanism are shown in a pickup or load position, where the transfer element 58 is in pickup position and the pad 126 is disposed to be moved through the tray 44 for engaging a slide S. At this point, the motor 98 is deenergized and the crank 64 is in the position indicated. It will be noted that the arm 72 is in engagement with the pin 124. Upon energization of the motor 98, the armature 116 will be attracted by the magnetic flux of the motor to cause the lowering of the pin 124 thereby freeing the crank 64 for rotation.

In FIG. 7, the crank 64 has rotated 180° or one-half turn and in so doing has moved the transfer element to the projection position. The element 58 has moved the slide S therewith so that the latter is in position opposite the aperture in the wall 24 for projection by the system 14. It will be noted that the pad 126 is not in contact with the slide in this illustration of the parts. During rotation of the arm 66 from its position shown in FIG. 6 to the position shown in FIG. 7, the transfer element 58 would have moved to a position farther to the right than what is shown in FIG. 7 since the effective total length of the arm 66 and the link 70 is greatest when the arm 66 is approximately parallel to the rod 56 and on the same side of the axis of the shaft 76. In FIG. 7, the pad 126 is shown on its way back to the starting position indicated in FIG. 6 since the arm 66 has been rotated slightly beyond the point where the same is parallel to the rod 56.

The parts shown in FIG. 7 are again immobile while the slide S is in projection position. As will be described hereinafter, at certain conditions of operation the motor 98 would be deenergized and the pin 124 in engagement with the arm 66. After projection of the slide S, the motor 98 may again be energized to attract the armature 116 and to rotate the crank 64 for driving the transfer element to a return position as shown in FIG. 8. In moving to this position, the pad 128 would have contacted the edge of the slide S to move the same therewith back into the tray 44. As noted in FIG. 8, the slide has not quite come to rest since the arm 66 has not reached a position parallel to the rod 56 and on the opposite side of the axis of the shaft 76 whereat the effective length of the crank 64 and the link 70 is a minimum. The additional rotation of the crank 64 from the position shown in FIG. 8 to that shown in FIG. 6, would have carried the transfer element 58 to its extreme position and slightly toward the projection position as is the case when the parts are positioned as shown in FIG. 6. This carry-over or override of the element 58 will permit the movement of the pad 128 away from the tray 44 to prevent any interference therewith during indexing of the tray.

Cooperable with the movement of the link 70 is a shutter 130 which is formed with a horizontally extending plate 132 having a vertically depending shutter plate 134 at one end. The other end of the plate 132 is pivotally mounted by a pivot pin 136 on an upright 138 of the base 10, as shown in FIGS. 6–8. The shutter plate 134 is adapted for pivotal movement between a light intercepting position wherein the shutter is in alignment with the aperture 25 formed in the wall 24 of the housing 22 and a position wherein the shutter is out of this alignment, such as shown in FIG. 7. A torsion spring 140 is wrapped around the pivot pin 136 and has one arm 142 thereof biased against an anchor pin 144 secured to the plate 132 and the other arm 146 attached to the upright 138. A stop 148 secured to the upright 138 is adapted to engage one edge of the plate 132 to prevent rotation of the shutter in one direction under the bias of the spring 140 while permitting rotation of the same in the other direction.

Normally, the shutter 130 is biased to its light intercepting position by the spring 140 as the arms of the latter are in tension against their respective anchors, namely, the pin 144 and the upright 138. In order to pivot the shutter into and out of its operating position, there is provided on the under surface of the link 70 a leaf spring 150 which is bent at point 152 to form legs 154, 156. The leg 154 has one end fastened to the link 70 for supporting the spring 150 while the free bent leg 186 is free at its end to permit flexing of the spring. The spring 150 is adapted to engage the pin 144 on the shutter during both passes of the link 70, that is, during movement of the link in either direction. In moving the transfer element 58 to the projection position, that is, from the position shown in FIG. 6 to that of FIG. 7, the leg 154 of the spring 150 will engage the pin 144, however, since the plate 132 is against the stop 148, the spring 150 will merely flex as the leg 154 slides off of the pin 144. On the return pass of the link, as shown in FIG. 7, the other leg 156 of the spring will engage the pin 144 to force the same and the shutter into pivotal movement out of its light intercepting position.

The indexing mechanism for the present invention is best seen in FIGS. 3, 6, 7 and 8 and is cooperable with a rack 158 formed on the bottom plate 46 of the tray 44 for advancing the same in a step-by-step fashion automatically or manually as the case may be.

As previously stated, the rotation of the shaft 76 will impart rotation to the clutch sleeve 90. Radially projecting from the sleeve 90 is an actuator pin 160 secured within a bore 162 and being adapted for rotation about the axis of the shaft 76 during rotation of the latter. The pin 160 is adapted to be received within any one of a plurality of grooves 164 of a helical index gear 166 secured to a shaft 168 rotatably mounted horizontally on the deck 60. A gear 170 secured to one end of the shaft 168 is cooperable with the rack 158 formed on the tray 44. The pitch of the grooves 164 on the helical gear 166 is such that rotation of the latter an angular distance equal to the pitch will advance the tray 44 a distance equal to the distance between two adjacent slides S. For every full rotation of the clutch sleeve 90, the pin 160 will be received within and slide along one of the grooves 164 for rotating the gear 166 and advance the tray.

The cooperation of the slide tray indexing mechanism with the slide pickup and return mechanism is illustrated schematically in FIGS. 6, 7 and 8. In FIG. 6, the pin 160 is shown out of engagement with the gear 166 and the slide transfer element 58 in position to pick up a slide, assuming, of course, that the tray 44 is in position for permitting the pickup. As the crank 64 is rotated clockwise to the position shown in FIG. 7, the transfer element 58 has moved to the right for projection of the slide S and the pin 160 has also been rotated clockwise along with the clutch sleeve 90. In FIG. 8, after further clockwise rotation of the crank 64, the pin 160 has been rotated and has just entered one of the notches 164 of the gear 166. In this position of the parts, the transfer element 58 has returned the slide S to the tray and the gear 166 is about to be rotated under the driving force exerted by the sliding of the pin 160 along the groove 164. Further rotation of the clutch sleeve 90 will rotate the gear 166 to effect advancement of the tray to the next slide. Continuous cycling of the transfer mechanism under the action of the motor 98 will automatically cause step-by-step rotation of the gear 166 to advance the tray. A knob 172 secured at the other end of the shaft 168 remote from the gear 170 may be utilized to effect manual indexing or advancement of the tray.

In order to positively lock the tray into position during projection of a slide, there is provided a locking lever 174 pivoted at one end at 176 to the underside of the deck 34. The other end of the lever is formed with a prong 178 which is adapted to be received within the notches 180 of a rack 182 formed on the under surface of the support plate 46 of the tray 44. The prong 178 lies in a plane slightly offset with respect to the main portion of the lever 174 and protrudes through a slot 184 formed in the deck 34. A torsion spring 186 having one end fastened to the lever 174 is wrapped around the pivot 176 and anchored at the other end to a pin 188 secured to the deck for normally biasing the lever into engagement with one of the notches 180.

In order for the indexing mechanism to advance the tray 44, the locking lever 174 must be rotated against the bias of the spring 186 as the index gear 170 is rotating. To this end, the depending leg 62 of the transfer element 58 has a vertical extension 190 which terminates in a horizontally disposed arm 192 which is movable with the transfer element. The arm 192 is movable horizontally in a line slightly below the plane of the deck 34 and to accommodate this movement, the deck is formed with a slot 194 through which the arm 192 extends and which is in alignment with the movement thereof. As shown in FIGS. 5, 6, 7 and 8, the extreme outer tip 196 of the arm 192 is adapted to abut the locking lever 174 when the transfer element 58 is moved to the pickup position and thereby rotates the lever out of engagement with the rack 182 for permitting indexing of the tray 44 as aforesaid.

Tray holding and release means are provided on the projector for preventing the movement of the tray 44 beyond a predetermined position within the holder 16 wherein the tray will be disposed for operation, that is, where the entry end of the tray is in position for permitting the removal of the first slide. The purpose of this means is to insure that the other structure of the projector is in condition and in proper relationship to accept the projection of the slides thereby rendering the projector safe for operation against the possibility of damage to the other structure. Another purpose is to provide a positive stop for the movement of the tray in order to insure that the first slide in the tray will be projected. This means will not permit the movement of the tray into an initial operating position unless the transfer element 58 is in a pickup or load position wherein the slide engaging pads 126, 128 are clear of the movement of the tray.

Figure 5:
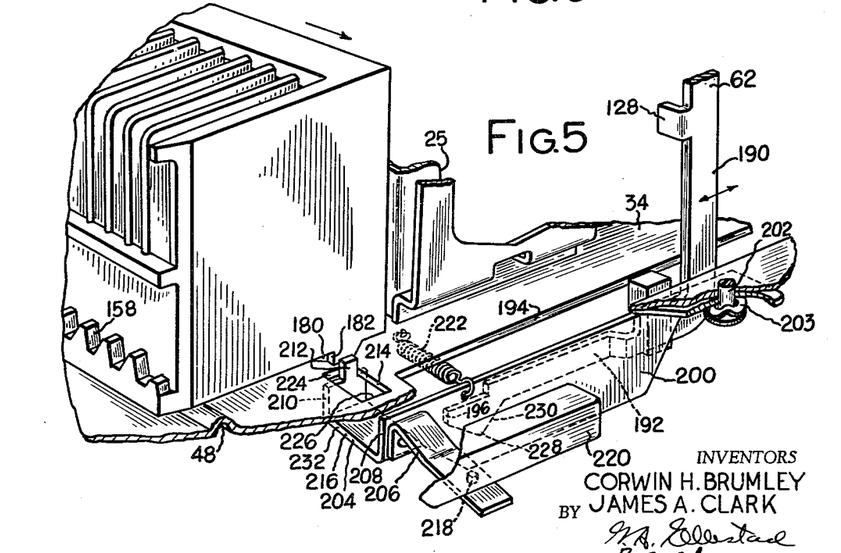
FIG. 5 is an enlarged perspective view of the tray holding and release mechanism utilized in the present invention.

As shown in FIGS. 4 and 5, a lever 200 is loosely pivoted on a pivot pin 202 secured to the under surface of the deck 34. A spring washer 203 of the bellville type encircles the pin 202 and is held in compression between the adjacent end of the lever and the deck 34 for normally biasing the lever in a vertical plane about an axis through the pin 202 and thereby maintain the lever in a horizontal plane. The lever 200 extends below the plane of the deck and parallel to the slot 194, terminating in an element comprising a U-shaped member 204 and a leaf spring 206. The member 204 is formed with a first upstanding leg 208 to which the lever 200 is integral with and a spaced second upstanding leg 210 which terminates in a narrow stop plate 212. The stop plate projects through a slot 214 formed in the deck 34 and is normally held in this position under the force of the spring washer 203 and thereby is adapted to engage the leading or entry end of the rack 182 of the tray 44. The leg 210 is shorter than the leg 208, exclusive of the stop 212, and both legs end in a plane parallel to the plane of the deck 34. The bight portion 216 between and joining the legs slopes downwardly toward the longer leg 208. The leaf spring 206 is secured at one end to the leg 208 and extends generally in the line of the legs of the member 204 but on the side of the lever 200 remote from this member. As shown in FIG. 5, the spring 206 is slightly bent or tapered downwardly and is adapted to actuate, in certain positions thereof, the contact button 218 of a microswitch 220 mounted on the underside of the deck 34. The lever 200, the member 204 and the spring 206 resemble a T-shaped structure with the spring and the member disposed as arms of the T.

A coil spring 222 is connected at one end to the lever 200 and at the other end to the deck 34 and normally biases the lever in a direction to force the stop 212 against a side 224 of the slot 214 adjacent the entry side of the tray holder 16. Upon movement of the tray 44 through the holder 16, the leading end of the rack 182 will first engage the stop 212, then move the member 204 against the bias of the spring 222 until the stop 212 abuts against the other end 226 of the slot 214 wherein further movement of the tray is prevented. With the tray against the stop and the stop against the slot end 226, the first slide S is in alignment with the pickup pad 126, that is, in a pickup position. The location of this end of the slot on the deck 34 will be determined by the thickness of the end wall of the tray and the distance between the first slide and this end wall. In so moving, the spring 206, which is normally in pressing engagement with the contact button 218 for one condition of operation of the projector, will be moved in the direction of movement of the tray, as seen in FIG. 5, without affecting the initial condition of the switch.

In order to release the positive stopping effect of the stop 212 when the same is against the end 226 of the slot 214, the lever 200 is adapted for limited pivoting in a vertical plane against the bias of the spring washer 203 in order to lower the member 204 a sufficient distance for the stop 212 to clear the rack 182. The arm 192 is provided with a triangular shaped cam 228 on the lower edge thereof adjacent the extreme tip 196, which cam is adapted to always travel between the legs 208, 210 of the member 204 regardless of the positions of the member as determined by which end of the slot 214 the stop 212 may be against. When the stop 212 is against the end 226 of the slot, the cam 228 will pass adjacent the leg 210 which is short enough to permit sliding engagement of the angular edge 230 of the cam upon the adjacent edge 232 of the bight portion 216 when the arm 192 is being moved from the pickup or load position toward the projection position along with the transfer element 58. The angular edge 230 will slide along the edge 232 and, in so doing, the member 204 will be forced downwardly until the extreme lower apex of the cam 228 reaches the upper surface of the bight portion. Continued movement of the arm 192 will effect sliding of the apex of the cam across the bight portion.

Lowering of the member 204 moves the stop 212 downwardly out of the path of the leading end of the rack 182 and also separates the spring 206 from the button 218 of the switch 220 to thereby actuate the same to another condition of operation, as will be described more fully hereinafter. As previously stated, the tip 196 of the arm 192 serves to pivot the locking lever 174 out of engagement with the rack 182 when the transfer element 58 approaches projection position. During this operation, the extreme lower apex of the cam 228 rides upon the upper surface of the bight portion 216 and the actuator pin 160 is about to commence its run through the groove 164 of the index gear 166 for rotating the gear 170 to advance the tray. While the transfer element 58 is moving the slide to a projection position, the cam 228 will slide off of the member 204 but since the tray has been advanced somewhat, the stop 212 will engage and slide along the smooth lower surface of the rack 182 instead of occupying its position of obstruction in advance of the tray. Upon this occurrence, the spring 222 will force the member 204 back into its original position whereat the stop 212 will abut the slot end 224. Once the tray has passed the stop 212, the contact button 218 will remain in its second condition of operation and the related structure of the lever 192, the member 204 and the spring 206 will maintain its lowered position.

With the stop 212 against the slot end 224, the low portion of the bight 216 adjacent the leg 208 will be far enough below the lower apex of the cam 228 that the same will not come in contact with the bight. During continuous reciprocation of the transfer element 58, while the tray is being advanced through the tray holder 16, the cam 228 will merely pass over the bight without interference. During the operation of the above-described structure, the lever 200 experiences a pivotal movement in a horizontal plane about the axis of the pin 202 and in a vertical plane about an axis normal to the pin. It will be understood that the stop plate 212 may engage the leading end of the tray 44 at places other than at the end of the rack 182 in the event that a rack is not provided. In this event, it is contemplated that the stop plate may slide along a smooth surface of the bottom plate of the tray, or even along a corner thereof. It is also contemplated that the tray holding and release mechanism may be arranged in other positions relative to the tray instead of the disclosed location upon the deck 34.

The present projector may be adapted for automatic operation, that is, for repeating the cycling of operation consisting of picking up a slide from the tray 44, moving the slide into projection position and thence back into the tray. In conjunction with this automatic cycling, a timer arrangment may be provided for controlling the time interval between each cycle. Any suitable timer may be utilized, but the present projector is particularly adapted for the pneumatic timer mechanism disclosed in the copending application, Serial No. 793,569, filed February 16, 1959. A suitable timer shown schematically at 236 in FIGS. 1, 2, 4 and 6 is adapted to actuate a normally open switch 238 to a closed condition after the transfer element has been positioned in the projection position for a predetermined time interval. The operation of the timer mechanism commences when the transfer element has been moved into projection position and a slide has been moved therewith.

The electrical circuit and related structure for the projector along with the operation thereof will now be described. The projector and the included circuit is designed for semiautomatic and automatic operation and a mechanism may be provided for selectively conditioning the projector for either of these operations.

Figure 9:
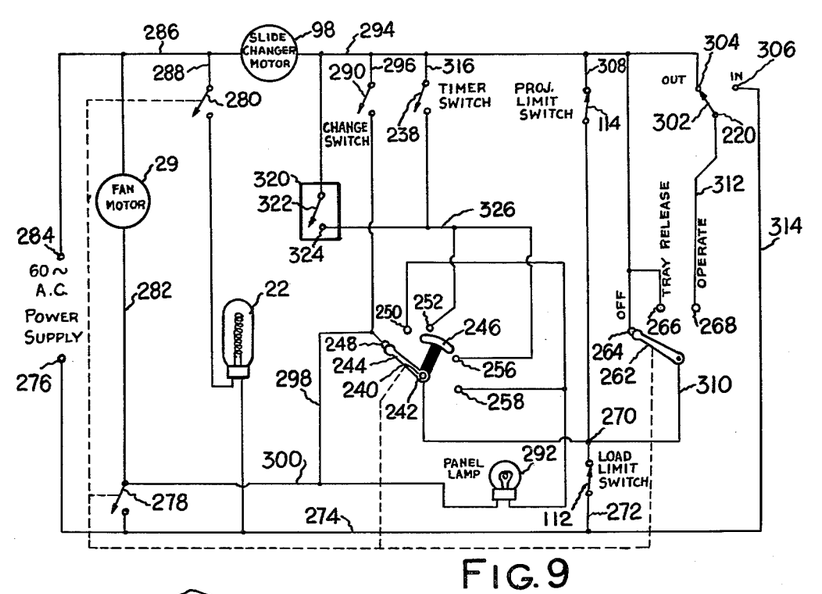
FIG. 9 is a diagram showing the various electrical circuits utilized in the present invention.

As shown in FIG. 9, a selector switch 240 is provided and may be mounted upon a suitable panel (not shown) having a knob associated therewith for controlling operation of the projector, as will presently be described. The switch 240 may be utilized in cooperation with suitable indicia embossed on the panel and being indicative of the "Off," "Tray Release," and "Operate" positions of the switch for facilitating these desired operations of the projector. The switch 240 includes an insulated shaft 242 to which a contact arm 244 and a conductor sector 246 are connected for rotation therewith. The contact arm 244 is electrically insulated from the sector 246 and is cooperable with any one of three contacts 248, 250 and 252 arranged in an arc on the switch and which are indicative of the "Off," "Tray Release" and "Operate" conditions of the projector. Similarly, the sector 246 is cooperable with contacts 256 and 258 arranged in an arc having a radius slightly smaller than the radius of the arc for the arm 244. The arm 244 and the sector 246 turn together when the shaft 242 is rotated and therefore the angular distance relative therebetween, as shown in FIG. 9, will remain constant for all positions of these parts.

The selector switch 240 also includes another contact arm 262 and a bank of three contacts 264, 266 and 268 cooperable therewith. The contact arm 262 is connected to the shaft 242 and therefore movable with the arm 244 and since the associated contacts are angularly spaced equally, the positioning of the arm 244 relative to one of its three contacts will cause corresponding positioning of the arm 262 relative to one of its three contacts.

The contact arms 244, 262 are electrically connected at a junction 270 via switch 112 to a common conductor 272 which is connected by a conductor 274 to one terminal 276 of a suitable source of electrical energy. The selector switch 240 also includes two single pole-single throw switches 278, 280 mechanically coupled to the shaft 242 and movable to closed positions when the contact arm 244 is moved from the "Off" contact 248 to any of its other contacts, namely, 250 and 252. The switch 278 connects a conductor 282 to the conductor 274 and thence to the terminal 276, and to the other terminal 284 of the electrical source by way of a conductor 286 for controlling the energization of the fan motor 29. The switch 280 is connected by a conductor 288 between the conductors 274 and 286 and serves to control the electric energy to the lamp 22. The remaining switch in the projector is a "Change" switch indicated by the reference numeral 290 in FIG. 9 and which must be actuated to the closed position in order to initiate operation of the projector. The switch 290 may be suitably mounted on a control panel for convenience to the operator. The switch is preferably of the normally open push button type which must be held in the closed position by the operator. Upon release, the switch will immediately revert to its open condition. A panel lamp 292 may be mounted on the panel for illuminating the same during certain stages of operation which requires the use of the knobs on the panel.

For automatic operation of the projector, the timer mechanism 236 is manipulated to a predetermined time interval which will commence to operate when the transfer element is moved to projection position. After this step, the shaft 242 is turned to the "Operate" position wherein the contact arms 244, 262 will be in engagement with the contacts 252, 268, respectively, and the sector 246 will bridge across the contacts 256, 258. A tray 44 of slides to be projected is introduced within the holder 16 and moved until the same engages and moves the stop 212 against the slot end 226. It will be assumed that the slide pickup and transfer mechanism 18 is in the load position, as shown in FIG. 6, wherein the normally closed limit switch 112 is held to an open position by the cam 104 and the normally closed projection limit switch 114 is free of the influence of the cam 106 and therefore is closed. In order to energize the motor 98 for actuating the transfer mechanism to the projection position with a slide, as shown in FIG. 7, the change switch 290 must be closed for the first action required to initiate operation of the projector. Energization of the motor 98 is then accomplished through a circuit traced as follows: terminal 284, conductor 286, motor 98, conductors 294, 296, switch 290, conductors 298, 300, switch 278, conductor 274 and terminal 276.

As the transfer element 58 starts to move to projection postion, the cam 104 will release the load switch 112 to its closed position for maintaining energization of the motor and, immediately after this action, the cam 228 will lower the member 204 to disengage the stop 212 from the tray and actuate the contact button 218 of the switch 220 downwardly in order to move the contact arm 302 of this switch out of its normal engagement with a contact 304 and into engagement with a contact 306. This action connects the motor 98 in a different circuit for continued energization thereof, such circuit being traced as follows: terminal 284, conductor 286, motor 98, conductors 294, 308, the normally closed projection limit switch 114, junction 270, conductor 310, contact arm 262, contact 268, conductor 312, contact arm 302, contact 306, conductors 314, 274, and the terminal 276. Once this circuit is completed, the "Change" switch may be released and, in actual practice, the operator need only push this switch momentarily as the load limit switch 112 becomes actuated almost immediately and the tray switch 220 shortly thereafter.

As the transfer element 58 approaches projection position, the projection limit switch 114 will be actuated by the cam 106 to an open position to thereby open the above circuit and terminate the energization of the motor 98. With the motor deenergized, the armature plate 116 will no longer be attracted thereby and will move upwardly to enable the locking pin 124 to engage the end of the crank arm 66 for positively stopping the movement of the transfer element 58 at projection position, see FIG. 7.

After a predetermined time interval, as set by the timer 236, the switch 238 will be actuated to a closed condition. Upon this occurrence, the motor 98 will become energized to attract the armature plate 116 and free the crank arm 66 for rotation. Energization of the motor 98 is traced as follows: terminal 284, conductor 286, motor 98, conductors 294, 316, timer switch 238, contact 252, contact arm 244, junction 270, conductor 310, switch arm 362, conductor 312, switch arm 302, conductors 314, 274 and terminal 276. When the transfer element 58 travels a short distance past the projection position, the cam 106 will have rotated enough to permit the normal closing of the projection limit switch 114 for maintaining the energization of the motor 98. This cycle of operation will move the transfer element back to a return position over the tray 44 in order to return the projected slide, pick up another slide and carry the same to the projection position as the tray is advanced the distance equal to the distances between slides in the tray. This cycling of the operation of the projector will continue until all of the slides S have been projected or the projector is shut off. During automatic operation while all the slides in the tray are being projected, the circuit for the energization of the motor 98 will alternate with the closing of the timer switch 238 on the one hand and the closing of the projection switch 114 on the other hand.

When the tray 44 has been advanced until the last slide is in load position, the stop 212 will continue to be held in its lower position by the bottom of rack 182 but will be at the extreme end thereof ready for upper movement upon the slightest advance movement of the tray. The size of the slot 214, or at least the distance between the ends 224, 226 of the slot, is such that the stop will remain in its lowered position until the last slide has been projected and returned to its position within the tray. Upon this occurrence, as the tray commences to be advanced, the stop will immediately rise, and the contact arm 302 of the tray switch 220 will move to contact 304 thus opening the circuit to the motor 98 while the transfer element is in load position. Simultaneously with this action, the panel light 292 will once again become energized. The circuit for the lamp is established since the shorting effect of the load limit switch 112 and the tray switch 220 is eliminated and the projection limit switch 114 is closed.

In this condition of the projector, the tray 44 may be removed manually from the holder 16 and another tray inserted or the projector may be shut off merely by rotating the contact arm in engagement with the "Off" contact 248.

In the event semi-automatic operation is now desired, the same operation may be accomplished by the manual manipulation of the "Change" switch 290 while the operator is in the vicinity of the projector or with a remote switch. As shown in FIG. 9, the remote switch 320 includes a contact arm 322 connected to the conductor 294 and a contact 324 connected by a conductor 326 to the contacts 252, 256 of the selector switch 240. As previously stated, the actuation of the "Change" switch 290 is required in order to commence automatic operation of the projector. This step is also required for semi-automatic operation when utilizing the remote switch 322. Upon actuation of the "Change" switch, the transfer element will stop in the projection position with a slide which may be projected as long as desired. In order to return this slide to the tray and pick up another for projection, the operator need only actuate the "Change" switch each time that a new slide is desired. The circuit for this operation has been previously traced and further description thereof is unnecessary.

In the event that remote control is desired, the closing of the remote switch 322 closes the circuit for the motor 98 as follows: terminal 284, conductor 286, motor 98, conductor 294, switch 322, conductor 326, contact 252, arm 244, junction 270, switch 112, conductor 274 and terminal 276. This closing of the switch need only be made momentarily since the initial movement of the transfer element 58 from the projection position will permit the normal closing of the projection limit switch 114 and the circuit to the motor 98 will be maintained. The panel lamp 292 will remain off during the showing of the tray regardless if the change switch or remote switch is being utilized.

When the last slide of a tray has been returned, whether automatic or semi-automatic operation is utilized, the transfer element 58 will always return to a load position, since the tray switch 220 is allowed to assume its tray out condition, that is, the contact arm 302 will become disengaged from the contact 306. Under these circumstances, there can be no energizing circuit for the motor 98. On the other hand, when a tray is in a position within the holder 16, stopping of the transfer element 58 will always occur at the projection position.

From the foregoing description, it will be appreciated that the present invention provides a unified and compact structure which is adapted to receive a slide tray carrying a plurality of slides and individually remove each of the slides from the slide tray, project the same, return it to its former position within the tray, and advance the tray for another cycle of operation. A novel tray holding and release mechanism is provided in order to insure the stopping of the tray in a position wherein the first slide in the tray will be projected initially. While there is in this application specifically described one form which the invention may assume in practice, it will be understood that this form is shown for purposes of illustration, and that the same may be modified and embodied in various other forms or employed in other uses without departing from its spirit or the scope of the appended claims.

We claim:
1. In a slide projector of the type having a slide tray for storing a plurality of slides in parallel side by side position, a light source, and an aligned optical system defining a projection position, the combination comprising a base, a tray holder for guiding movement of the tray during indexing thereof, a reciprocably movable slide transfer element for moving a slide out of the tray from a load position and into the projection position and back into the tray, a motor mounted on said base and having a drive shaft associated therewith, means operatively associated with said drive shaft and connected to said transfer element for moving the latter between said positions when said motor is energized, a circuit connecting said motor to a source of electric energy, a switch in said circuit for causing energization of said motor when said switch is actuated to a closed position, holding means mounted on said base and engageable with the tray for preventing movement of the same through the holder beyond a predetermined position therein, said holding means being engageable with said switch for actuating the same to an open position when said holding means is in engagement with the tray, and an element connected to said transfer element and engageable with said holding means for releasing the holding effect thereof upon the tray and for closing said switch when said transfer element moves from the load position to the projection position.

2. In a slide projector of the type having a slide tray for storing a plurality of slides in parallel side by side position, a light source, and an aligned optical system defining a projection position, the combination comprising a base, a tray holder for guiding movement of the tray during indexing thereof, a reciprocably movable slide transfer element for moving a slide out of the tray from a load position and into the projection position and back into the tray, a motor mounted on said base and having a drive shaft associated therewith, means operatively associated with said drive shaft and connected to said transfer element for moving the latter between said positions when said motor is energized, a circuit connecting said motor to a source of electric energy, a switch in said circuit for controlling the energization of said motor, a stop member mounted on said base and movable into and out of the indexing path of movement of the slide tray, said member being engageable with said switch for actuating the same between controlling positions, means for normally biasing said member into said path of the slide tray for normally preventing movement of the tray through said holder, said last-named means also biasing said member to a position for actuating said switch to an open condition to thereby open said circuit to said motor, and an element connected to said transfer element and engageable with said stop member for moving the same out of the path of the slide tray and to permit closing of said switch when said transfer element moves from the load position to the projection position.

3. In an automatic slide projector of the type including means for receiving a compartmented magazine, a transfer mechanism for moving slides out of the magazine and returning them thereto, and means for indexing the magazine in timed relationship to the operation of the transfer mechanism, the improvement comprising a stop for engagement by the magazine when the magazine is inserted into the projector for positioning the magazine in a desired position in the projector, said stop including a vertically movable abutment member movable alternately into and out of the path of the magazine, and yieldable means for urging said member into the path, said member being arranged to slide along a continuous wall portion of the magazine and thereby to be held out of the path during passage of the magazine, means for retracting said member from the magazine path in response to actuation of the transfer mechanism thereby to enable the magazine to begin its passage, and switch means for deenergizing the transfer mechanism in response to movement of said member into the magazine path after the magazine completes its passage.

4. In an automatic slide projector of the type including means for receiving a compartmented magazine, a transfer mechanism for moving slides out of the magazine and returning them thereto, and means for indexing the magazine in timed relationship to the operation of the transfer mechanism, the improvement comprising a stop for engagement by the magazine when the magazine is inserted into the projector for positioning the magazine in a desired position in the projector, said stop including a vertically movable abutment member movable alternately into and out of the path of the magazine, and yieldable means for urging said member into the path, said member being arranged to slide along a continuous wall portion of the magazine and thereby to be held out of the path during passage of the magazine, said member having a flat abutment surface normal to and facing a magazine held in position ready to start its normal movement through the projector, means for retracting said member from the magazine path in response to the actuation of the transfer mechanism thereby to enable the magazine to begin its passage in the normal forward direction from said desired position, and switch means for deenergizing the transfer mechanism in response to movement of said member into the magazine path after the magazine completes its passage.

References Cited in the file of this patent

UNITED STATES PATENTS

| | | |
|---|---|---|
| 2,401,506 | Pechkranz | June 4, 1946 |
| 2,460,359 | Page | Feb. 1, 1949 |
| 2,705,438 | Peto | Apr. 5, 1955 |
| 2,922,334 | Krull | Jan. 26, 1960 |